United States Patent

[11] 3,551,582

| [72] | Inventor | Nicola Palmieri<br>Milan, Italy |
|---|---|---|
| [21] | Appl. No. | 743,831 |
| [22] | Filed | July 10, 1968 |
| [45] | Patented | Dec. 29, 1970 |
| [73] | Assignee | Pirelli Societa Per Azioni<br>Milan, Italy<br>a corporation of Italy |
| [32] | Priority | Aug. 4, 1967, Nov. 11, 1967 |
| [33] | | Italy |
| [31] | | Nos. 19,205/67 and 22,583/67 |

[54] ACCESSORIES FOR CABLES CARRYING VERY HEAVY CURRENTS
8 Claims, 4 Drawing Figs.

[52] U.S. Cl. .................................................... 174/19
[51] Int. Cl. ............................................... H02g 15/20
[50] Field of Search ........................................... 174/19-
—23, 25, 25G, 73

[56] References Cited
UNITED STATES PATENTS

| 1,878,169 | 9/1932 | Myers ........................... | 174/73 |
| 2,013,537 | 9/1935 | Eby ............................... | 174/19 |
| 2,222,718 | 11/1940 | Phillips ......................... | 174/73X |
| 2,237,402 | 4/1941 | Beaver et al. .................. | 174/21 |
| 2,401,996 | 6/1946 | Wetherill ....................... | 174/19 |
| 3,049,581 | 8/1962 | Palmieri ........................ | 174/73 |

FOREIGN PATENTS

| 439,575 | 12/1935 | Great Britain ................ | 174/19 |

OTHER REFERENCES

The Condensed Chemical Dictionary, Sixth Ed. Reinhold pp. 1093 QD 5 c5 1961 c. 12

Primary Examiner—Lewis H. Myers
Assistant Examiner—A. T. Grimley
Attorney—Ward, McElhannon, Brooks & Fitzpatrick ABSTRACT: The insulation for an accessory intended for use in conjunction with high current capacity electric cables is formed from three concentric components of which the innermost component is represented by impregnated paper disposed over the current carrying members, the intermediate component consists of a tubular structure of mechanically strong insulating material around the innermost component, and the outermost component is represented by a quantity of electronegative gas confined between the intermediate component and an outer gastight casing of rigid material.

INVENTOR.
NICOLA PALMIERI

ACCESSORIES FOR CABLES CARRYING VERY HEAVY CURRENTS

The present invention relates to accessories for use with high current capacity electric cables.

Cables intended for the transmission of electric power with extremely high currents have been dimensioned, for reasons or economy, in such a way that the conductor or conductors reach a fairly high temperature, for example, of the order of 85° C. (185° F.), when carrying full load. Attainment of this temperature level is sometimes prevented by the fact that in some parts of the installation, particularly in the joints and sealing ends, the insulation is made up of layers of insulating material having greater thickness than in the cable proper. Consequently, this greater electrical insulation thickness provides greater thermal insulation so that if the maximum allowable temperature of the conductor under such insulation is not to be exceeded, the actual temperature of the adjacent cable must be lower than the design value mentioned above. The economic disadvantage should be readily apparent.

It is to be understood that throughout the ensuing description and claims, the term "accessory" is used to mean either a joint or sealing end, or the like.

A purpose of the present invention is to provide an accessory in which the electrical insulation does not have a thermal resistance substantially greater than that of the cable insulation.

In an accessory of the type contemplated herein it may be desired to provide for the circulation of insulating oil for its cooling action. This method of cooling, well known in the art, is accommodated in accessories described herein by providing a passage through which the oil can be admitted to or discharged from the cable. Consequently, a further purpose of the invention is to provide an accessory of the foregoing type in which a passage for oil is provided in order to carry out a cooling function.

In accordance with one aspect of the invention, there is provided in an accessory for high current capacity electric cables insulation comprising three concentric components of which the innermost component is represented by impregnated paper disposed over the current carrying members, the intermediate component consists of a tubular structure of mechanically strong insulating material tightly disposed around the innermost component and the cable, and the outermost component is represented by a quantity of electronegative gas confined between the intermediate component and an outer gastight casing of rigid material. The innermost component may be applied over the conductor or conductors and their associated ferrule. The insulating material of which the intermediate component is formed may, for example, consist of an epoxy resin loaded with quartz. The electronegative gas may be, for example, sulfur hexafluoride, possibly mixed with nitrogen or other inert gases. Preferably, the gas is under a pressure of from 2 to 15 kg./cm$^2$.

It has been shown by experiment that, by keeping the impregnated paper insulation and the intermediate component surrounding it sufficiently thin, it is possible to attain very low values of thermal resistivity for the insulation. This is due to the high termal conductivity of the gas, particularly sulfur hexafluoride, especially when movement of the gas by reason of convection currents is permitted.

In accordance with a further embodiment of the invention the intermediate component is radially spaced from the innermost component by a distance of at least 1 millimeter to provide a fluid passage therebetween. This spacing is provided in order to permit circulation of cooling oil. Preferably the radial spacing is dimensioned between 1 and 10 millimeters. Provision of the space for the oil is feasible because of the fact that the electronegative gas constituting the outermost component of insulation has a dielectric constant lower than that of the insulating paper normally used in such accessories. Consequently, the difference of potential developed across the gas-filled zone is increased while that developed across the space containing the cooling oil is reduced. As a practical matter, the increase in the difference of potential developed across the gas is not a matter of concern since, as the electric field has a cylindrical symmetry, its outermost zone, the gas zone, is the least stressed.

Still further in accordance with the present invention, thin cylindrical barriers of insulating material, as for instance paper, may be inserted in the toroidal space filled with gas constituting the outermost component of insulation in order to increase the dielectric strength of the outermost component without substantially affecting the effective dielectric constant thereof.

The invention is applicable to accessories of various forms depending on whether the accessory is a joint between two lengths of cable or a sealing end. The invention will be better understood after reading the following detailed description of several preferred embodiments thereof with reference to the appended drawings in which.

Throughout the several figures the same reference numerals will be used to designate the same or similar parts.

Figure 1:
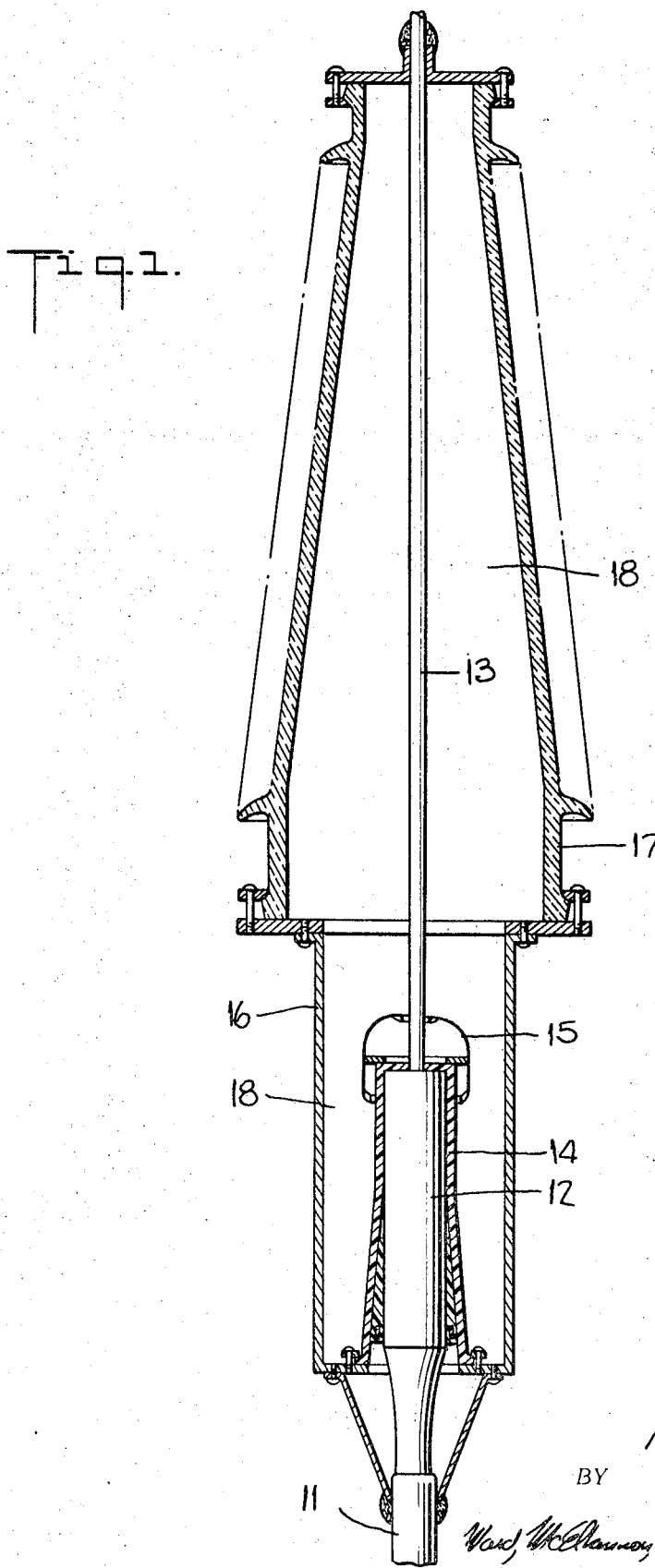
FIG. 1 is a longitudinal sectional view of a sealing end.

Referring now to the drawings, and particularly to FIG. 1, there is shown a cable designated generally by the reference numeral 11 ending in a termination where the ferrule applied to the end of the conductor in the usual manner is concealed by the covering of the impregnated paper insulation 12. From this insulation 12 the terminating conductor 13 emerges. The conductor 13 is connected to the ferrule in known manner although not shown in the drawing. Telescoped over the insulation 12 is a sleeve 14 of insulating material, for example, epoxy resin filled with quartz, secured at the upper end to the conductor 13 under an electrostatic screen 15. The lower end of the sleeve 14 is secured to a metallic casing 16, above which is mounted the usual insulator 17 tightly secured at its upper end to the terminating conductor 13.

The internal space 18, that is, the space between the sleeve 14 and the casing 16 and the space within the insulator 17 is filled with sulfur hexafluoride or other electronegative gas.

Figure 2:
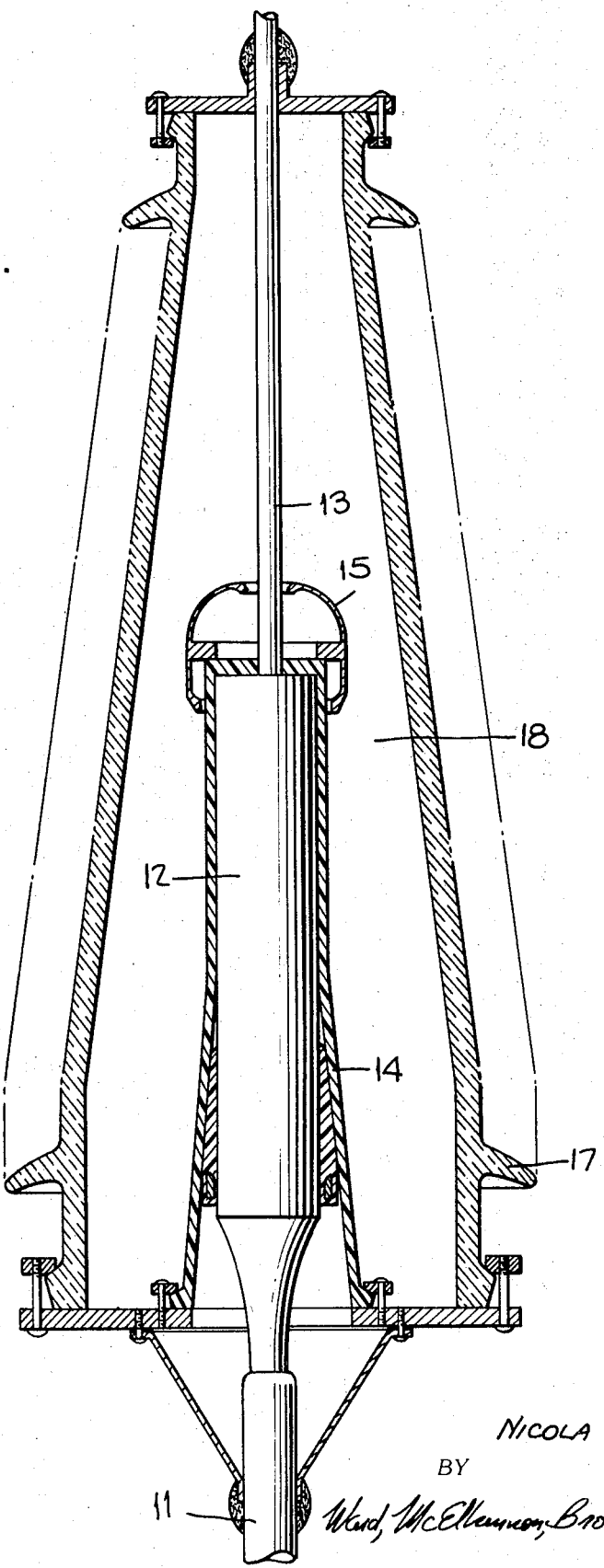
FIG. 2 is a longitudinal sectional view of a sealing end representing a modification of the sealing end of FIG. 1.

FIG. 2 shows a modified construction in which the casing 16 is omitted. The sleeve 14 is accommodated directly within the insulator 17. The space 18, filled with electronegative gas, is completely enclosed within the insulator 17.

Figure 3:
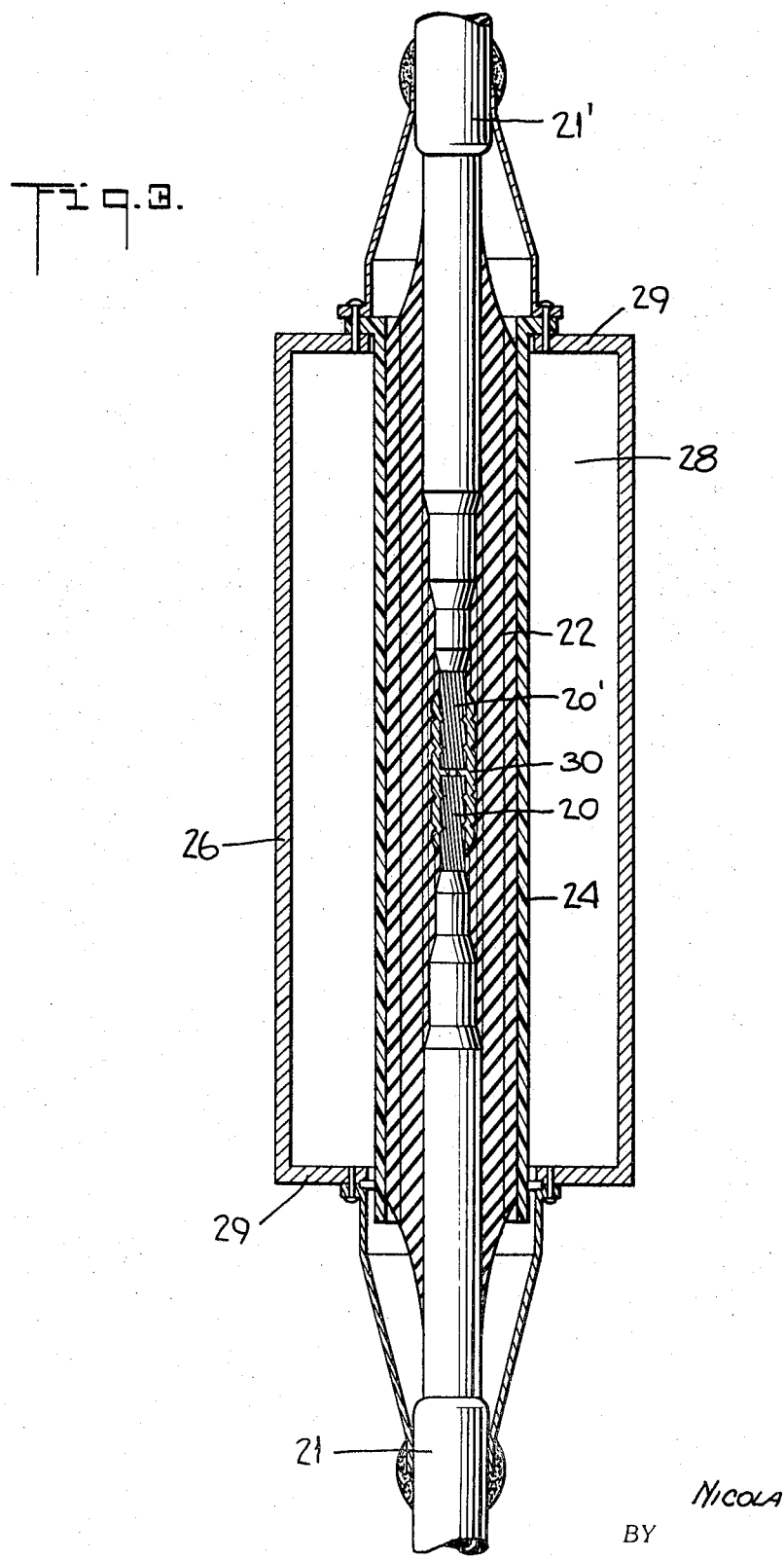
FIG. 3 is a longitudinal sectional view of a joint.
Figure 4:
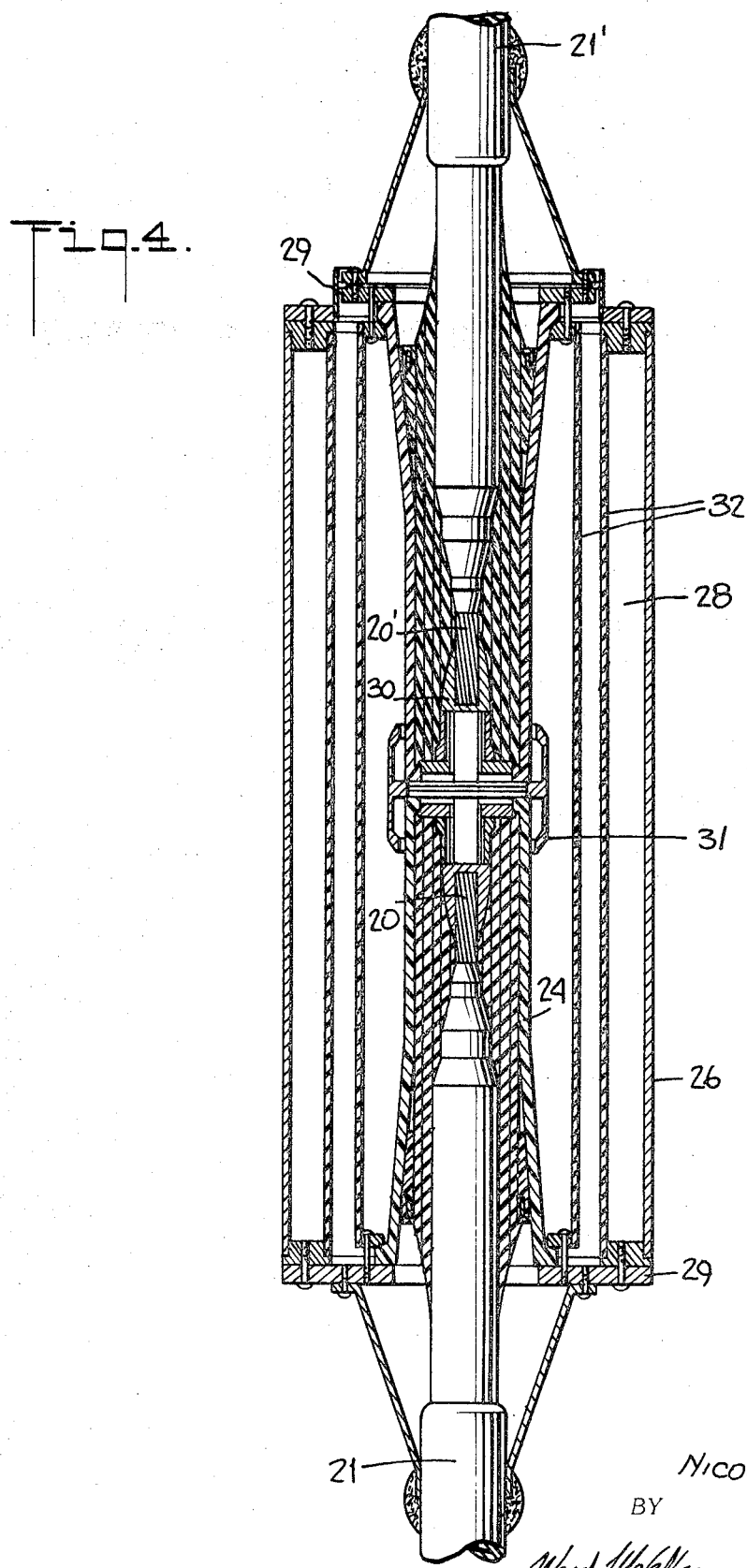
FIG. 4 is a longitudinal sectional view of another type of joint.

In the case of joints between two lengths of cable, the invention can be applied as shown in FIGS. 3 and 4. Referring thereto, the conductors 20 and 20' of the two cables 21 and 21' of FIG. 3 are connected by means of the ferrule 30 and are then covered by the impregnated paper insulation 22 on which the insulating sleeve 24 is telescoped. This sleeve is made, for example, of epoxy resin loaded with quartz. On the sleeve the metallic casing 26 is secured tightly by means of flanges 29. The annular space 28 between the sleeve 24 and the casing is filled with sulfur hexafluoride, possibly mixed with nitrogen or other inert gases.

If it is desired to electrostatically screen the junction points, as for instance in stop joints, the design may take the form shown in FIG. 4. As seen therein, the electrostatic screen is designated by the numeral 31. In this case, the gas filling the space 28 is required to withstand the full voltage. Also shown in FIG. 4 are the thin cylindrical barriers of insulating material 32, as for instance paper, inserted in the space filled with the gas. The inner layer of the material 32 can, if desired, be in contact with the electrode or screen 31.

The accessories described above provide not only the advantages of high thermal conductivity, which make it possible to carry very high current, but also the advantage of being quite easy to assemble and to be inspected after removing the gas pressure.

While the invention has been described with reference to several particular embodiments thereof, it is to be understood that various changes may be made therein, as will appear

I claim:

1. In an accessory for a high current capacity electric cable having a central conductor, four concentric components, the innermost component comprising oil impregnated paper around said conductor, the intermediate component nearest said innermost component comprising a self-supporting, substantially fluid impervious tube of mechanically strong insulating material having its inner wall spaced from said innermost component and having a substantially fluidtight seal at one end with said innermost component and a fluidtight seal at its opposite end with said cable to provide a substantially fluidtight oil passageway intermediate said intermediate component and said innermost component, the outermost component comprising a gastight casing of rigid material having gastight connections with said cable and having its inner wall spaced from said intermediate component to provide a gastight chamber between said outermost and said intermediate components and the fourth component comprising an electronegative gas in said chamber.

2. In an accessory for high current capacity electric cables having current carrying members, insulation comprising three concentric components of which the innermost component is impregnated paper disposed over the current carrying members, the intermediate component consists of a tubular structure of mechanically strong insulating material in fluidtight relation with said innermost component and the cable but with its inner wall radially spaced from the innermost component by a distance of at least 1 millimeter to provide a fluid passage therebetween, and the outermost component is a quantity of electronegative gas confined between said intermediate component and an outer gastight casing of rigid material.

3. An accessory according to claim 2, wherein said radial spacing distance is between 1 and 10 millimeters.

4. An accessory according to claim 3, wherein at least the major proportion of said gas consists of sulfur hexafluoride.

5. An accessory according to claim 4, wherein said gas is under a pressure of between 2 and 15 kilograms per square centimeter.

6. An accessory according to claim 5, wherein one or more thin barriers of insulating material are disposed in the space along with said gas between said intermediate component and said gastight casing for increasing the dielectric strength of said outermost component without substantially affecting the effective dielectric constant thereof.

7. An accessory according to claim 1, wherein at least the major proportion of said gas consists of sulfur hexafluoride.

8. An accessory according to claim 7, wherein said gas is under a pressure of between 2 and 15 kilograms per square centimeter.